US006557882B2

(12) United States Patent
Harrington

(10) Patent No.: US 6,557,882 B2
(45) Date of Patent: May 6, 2003

(54) ATV TRAILER APPARATUS

(76) Inventor: Michael H. Harrington, 5804 Resweber Hwy., St. Martinville, LA (US) 70582

( * ) Notice: Subject to any disclaimer, the term of this patent is extended or adjusted under 35 U.S.C. 154(b) by 39 days.

(21) Appl. No.: 09/846,120

(22) Filed: Apr. 30, 2001

(65) Prior Publication Data

US 2002/0158442 A1 Oct. 31, 2002

(51) Int. Cl.[7] .................................................. B60F 5/00
(52) U.S. Cl. .................. 280/415.1; 280/656; 296/37.1; 296/65.1
(58) Field of Search ............................ 280/415.1, 656; 296/65.01, 66, 37.1

(56) References Cited

U.S. PATENT DOCUMENTS

| | | | | |
|---|---|---|---|---|
| 519,832 A | * | 5/1894 | Bradley et al. | ............... 296/66 |
| 3,730,542 A | * | 5/1973 | Chadwick | ....................... 280/9 |
| 4,119,331 A | * | 10/1978 | Jackson | ....................... 280/650 |
| 4,126,324 A | * | 11/1978 | Browning | ..................... 280/42 |
| 4,511,181 A | * | 4/1985 | Schantz | ....................... 280/656 |
| 4,807,894 A | * | 2/1989 | Walker | ........................ 280/656 |
| 5,222,753 A | * | 6/1993 | Parish | ......................... 280/400 |
| 5,513,868 A | * | 5/1996 | Barr | ............................ 280/400 |
| 6,237,981 B1 | * | 5/2001 | Selleck | ......................... 296/66 |
| 6,422,641 B1 | * | 7/2002 | Coryell | ........................ 280/656 |

* cited by examiner

Primary Examiner—Daniel G. DePumpo
(74) Attorney, Agent, or Firm—Robert N. Montgomery

(57) ABSTRACT

An improved utility trailer for all terrain vehicles including brush and tree deflectors, spring suspension, flotation tires, enclosed storage and animal transport compartment, tail gates and side rails, dumping capability, conversion to personnel transporter further including a windshield to prevent personnel injury from low limbs and brush or mud thrown up by the ATV and an awning to provide shade and reduce heat. The trailer may also include such amenities as passenger cushions and drink holders.

16 Claims, 10 Drawing Sheets

ATV TRAILER APPARATUS

BACKGROUND OF THE INVENTION

1. Field of the Invention

This invention relates generally to trailer apparatus and more particularly to an All Terrain Vehicle (ATV) utility trailer apparatus with extended versatility having transformation capability for human and animal transport.

2. General Background 2.1 Various types of utility trailers have been developed for use with ATVs depending on the task to be performed. ATV trailers differ from other types of towed trailers such as may be towed by off road vehicles in that they, by their very nature, must be capable of a wide range of terrain; in many cases it is required they be towed over uncleared land. They are generally no larger than the towing ATV and must be tough enough to take substantial abuse while carrying considerable loads of non-uniform size and weight over any terrain. Most utility trailers towable behind jeeps, trucks, tractors etc. are design for highway speeds and trail use and are simply not capable of such abuse.

2.2 Since ATVs are commonly used for hunting, as well as work related task, it was inevitable that hunters would want to take their friends along as well. At first some hunters rode on the luggage rack behind the driver of the ATV, then the utility trailers were utilized to transport additional hunters to and from their deer stands, duck blinds etc. When these methods proved uncomfortable, specialty trailers were designed for the sole purpose of hunter transport to and from remote sites over, often, almost inaccessible terrain. Such trailers are disclosed in U.S. Pat. Nos. 5,222,753 and 5,513,868. This allowed the hunter to penetrate the wilderness to a far greater distance from camp than would be possible by foot. While such specialty ATV trailers do provide some additional comfort by providing a seat and some storage for hunting gear, they have no provisions for transporting such things as dogs, extensive provisions, or carrying a deer. Nor do such trailers have shock absorbing means. Although the '868 patent attempts to provide a means for the trailer to ride over a fallen tree, it makes no provision for surviving contact with stumps, where only one wheel is in contact with the ground, or for circumnavigating around trees. Such problems tend to over stress the trailer frame. Further, the specialty trailers are limited by their design and may not be useful in transporting a wide variety of things that may be necessary around a farm when not being used for hunting purposes. Therefore, a more versatile trailer is needed that is capable of being used as both a diversified utility work trailer and a hunter transport trailer, thereby making the trailer more economical.

SUMMARY OF THE INVENTION

The disclosed trailer apparatus is an improved utility trailer for all terrain vehicles. The trailer includes features which allow the trailer to be used for a variety of tasks commonly associated with ATV load transfer around homes farms, camps, etc. such as hauling fire wood, feed, hay, fertilizer, seed, and tools, while Improvements to the trailer further include brush and tree deflectors to prevent the trailer from hanging up while being maneuvered around trees and heavy brush, spring suspension to help absorb the rigors of rough terrain, flotation tires to help prevent bogging and further help absorb shock, covered compartment for animals, such as dogs, and storage for supplies and the like subject to harm due to inclement weather, tail gates to allow easy access and removal of animals and equipment, and side rails to prevent equipment from sliding off, dumping capability to allow loose material or heavy loads to be quickly dumped, conversion to personnel and/or animal carrier, including face shield to prevent injury from low limbs and brush or mud thrown up by the ATV, and an awning to provide shade and reduce heat. The trailer may also include such amenities as passenger cushions and drink holders.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

DETAILED DESCRIPTION OF THE PREFERRED EMBODYMENT

Figure 1:
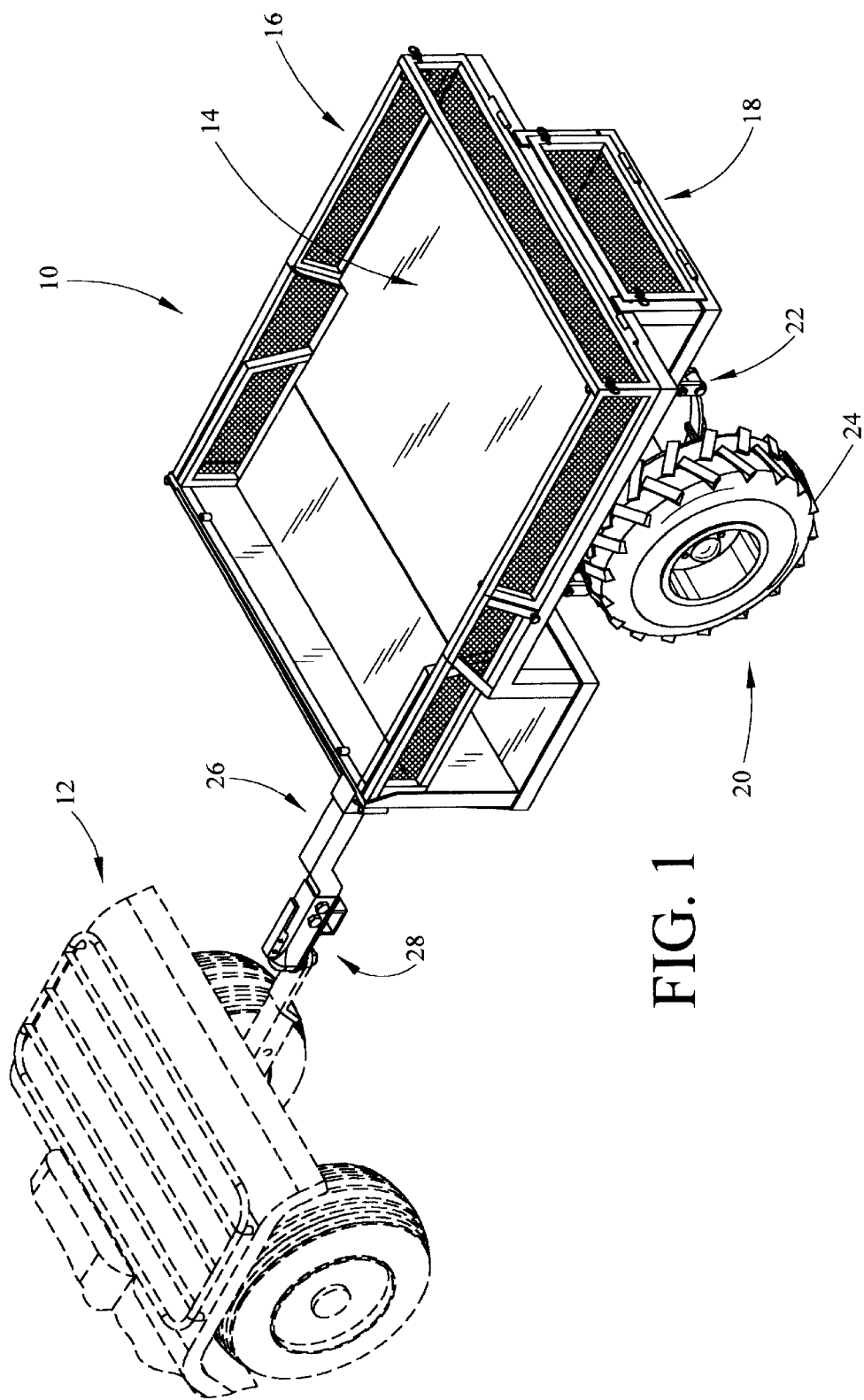
FIG. 1 is a rearward isometric view of the ATV trailer.

The present invention is an improved utility trailer assembly 10 for towing by all terrain vehicles (ATV) 12. As first seen in FIG. 1, the trailer 10 is somewhat wider than most ATV utility trailers, extending over the tires, and features a flat bed or deck 14 having a plurality of railing sections 16 around its perimeter and a lower enclosed compartment 18. The trailer is constructed of structural shapes, which may be steel or aluminum or fiberglass etc. Enclosures and decking are wood or other suitable sheet material, including wire mesh, flattened expanded metal, etc. The trailer 10 is supported by an undercarriage assembly 20 which includes spring assemblies 22, an axle and wheel assembly best seen in FIG. 8, and a set of high flotation tires 24. Such tires 24 are not N common to trailers since they have very aggressive tread, have relatively soft rubber, and are not made for highway towing. Tires 24 in conjunction with the spring assemblies 22 improve ride and help prevent bogging in wet or heavy brush terrain. The trailer is towable by the pivotal tongue assembly 26 coupled to the ATV 12 by typical ball and hitch arrangement 28. However, receiver and rotatable couplings, as well as simple clevis and pin hitches may be used.

Figure 2:
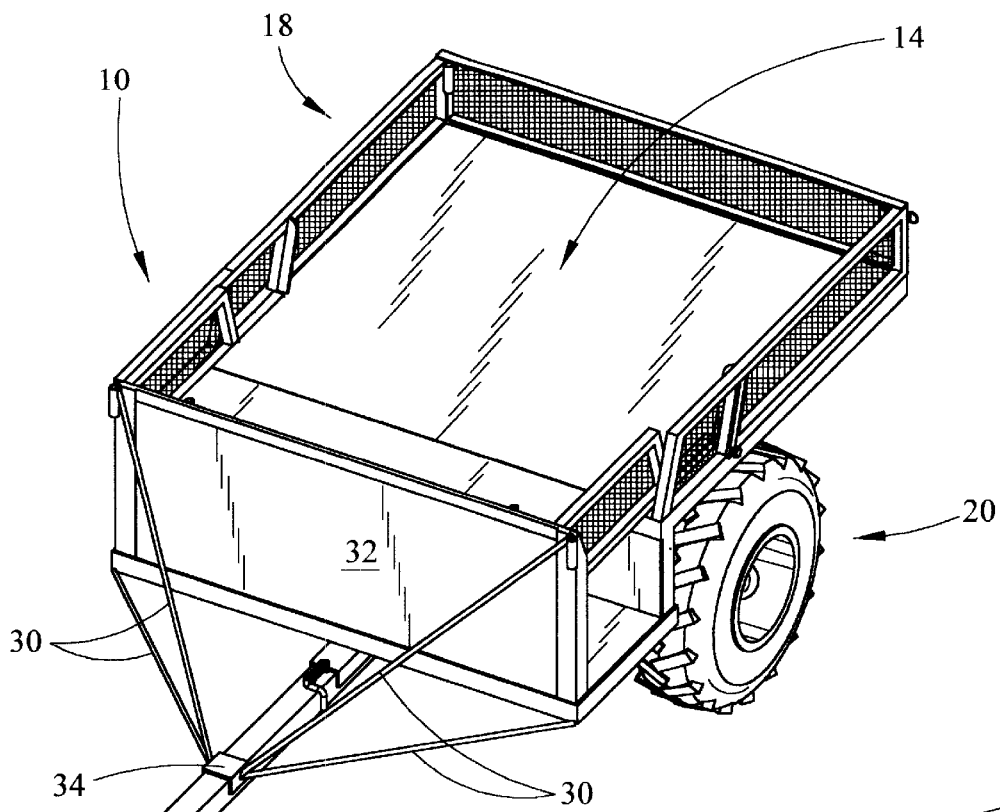
FIG. 2 is a frontward isometric view of the ATV trailer.

As result of the trailer 10 being as wide or wider than the towing ATV, obviously maneuvering around and between obstructions in dense brush could cause problems such as snagging. To counter these problems, deflector bars 30 are provided, which extend from each of the four corners of the front frame and panel 32, culminating at a channel bracket 34 slidable and disengageable upon the pivotal tongue member 36 in the manner illustrated in FIG. 2. Trees and heavy brush simply deflect the trailer by skidding the tires transversely.

Figure 3:
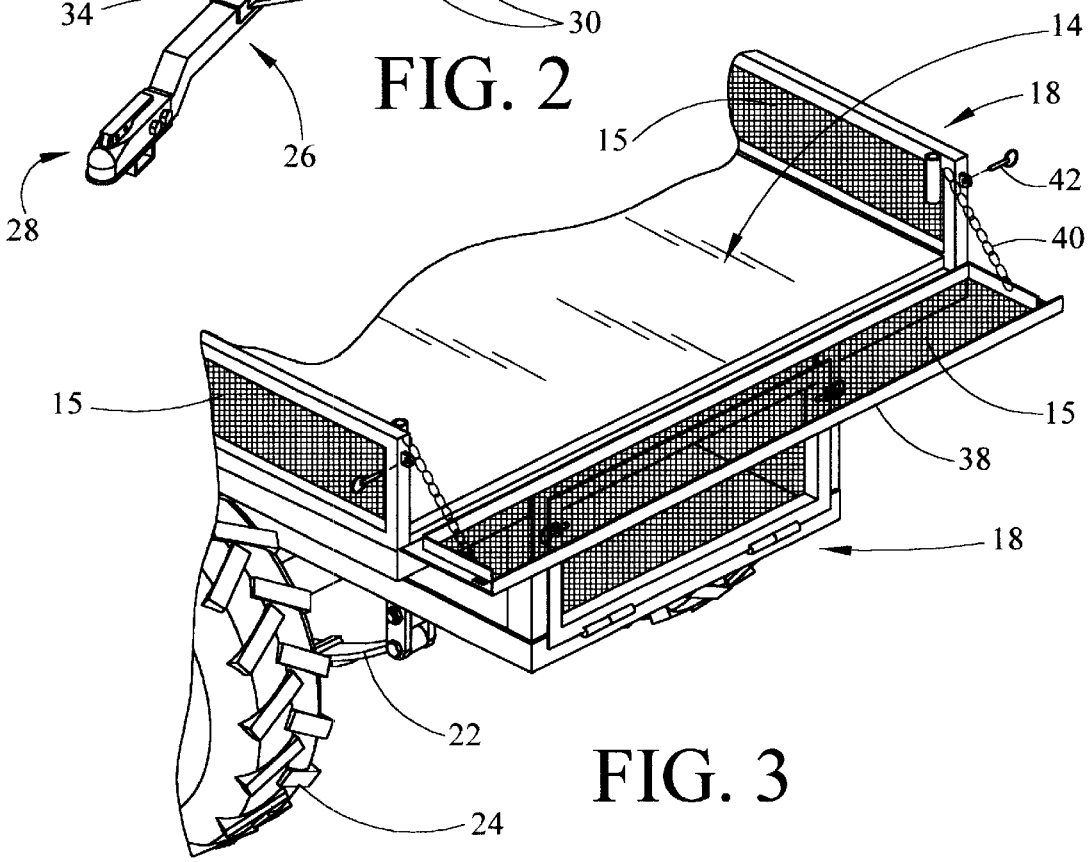
FIG. 3 is a rearward isometric view of the ATV trailer showing upper deck tailgate in open position.

Looking now at FIG. 3, we see that a rear portion of the perimeter rail 18 is hinged in tail-gate manner to provide access and egress of materials that maybe loaded on the flat bed or deck 14. The tailgate 38 may be supported in the open position with a chain or cable 40 and secured in the closed position with a hook or pin 42. It should be noted that the perimeter railing section is comprised of structural frames and includes a wire mesh 15 or other suitable lightweight material as filler.

Figure 4:
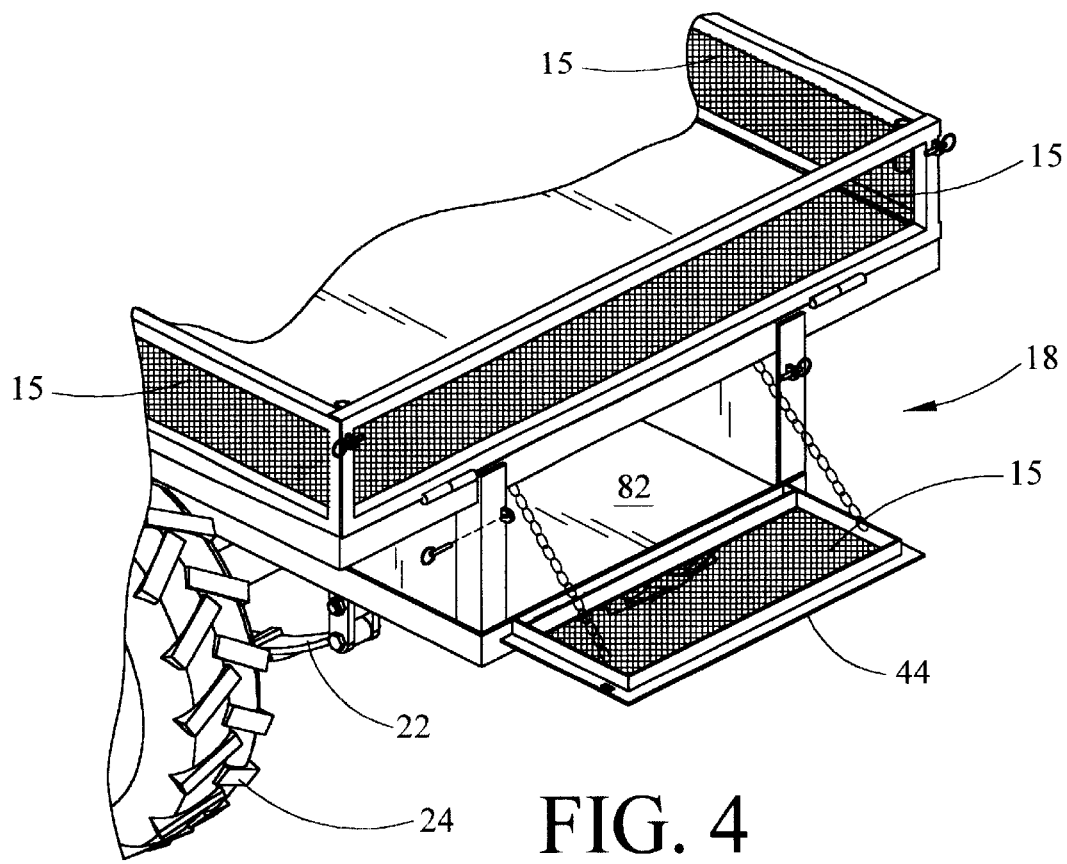
FIG. 4 is a rearward isometric view of the ATV trailer showing lower storage compartment tailgate in open position.
Figure 5:
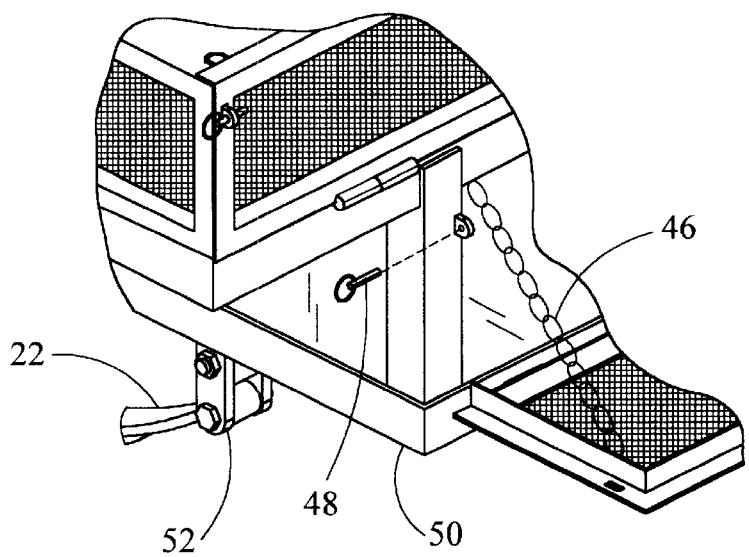
FIG. 5 is a partial isometric up scaled view of the lower storage compartment tailgate shown in FIG. 4.

Turning now to FIG. 4, we see a better view of the lower enclosed compartment 18 located between the wheels 24. This lower compartment 18 provides a secure, ventilated shelter for dogs or the storage of materials that may deteriorate if wet. The compartment 18 is accessible only though hinged tailgate 44 which may be supported in the open position by cables or chains 46 and secured by hooks or pins 48 as better seen in FIG. 5. Under carriage assembly 20 attaches to the lower frame members 50 of the enclosed compartment 18 with the spring hangers 52.

Figure 6:
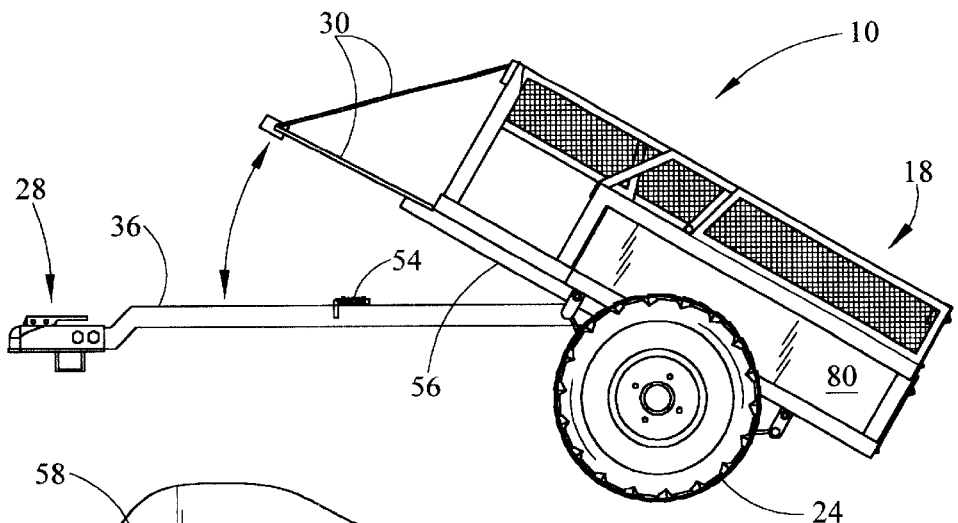
FIG. 6 is a side elevation view of the ATV trailer illustrated in FIG. 1 in the dump position.
Figure 7:
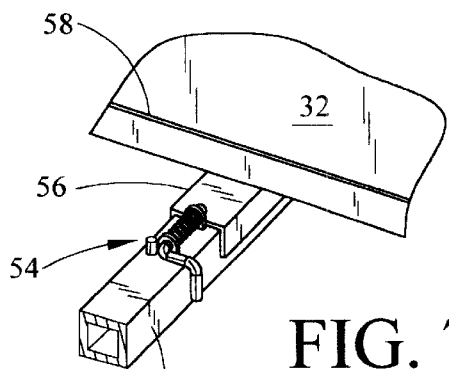
FIG. 7 is a partial isometric view of the dump latch.

Turning now to FIG. 6, we see the versatility of our utility trailer 10 includes the ability to dump its cargo. A release latch assembly 54 located on the tongue member 36 releases the pivotal tongue member 36 from its mating channel member 56 attached to lower frame members of the trailer 10, seen in the latched position in FIG. 7.

Figure 8:
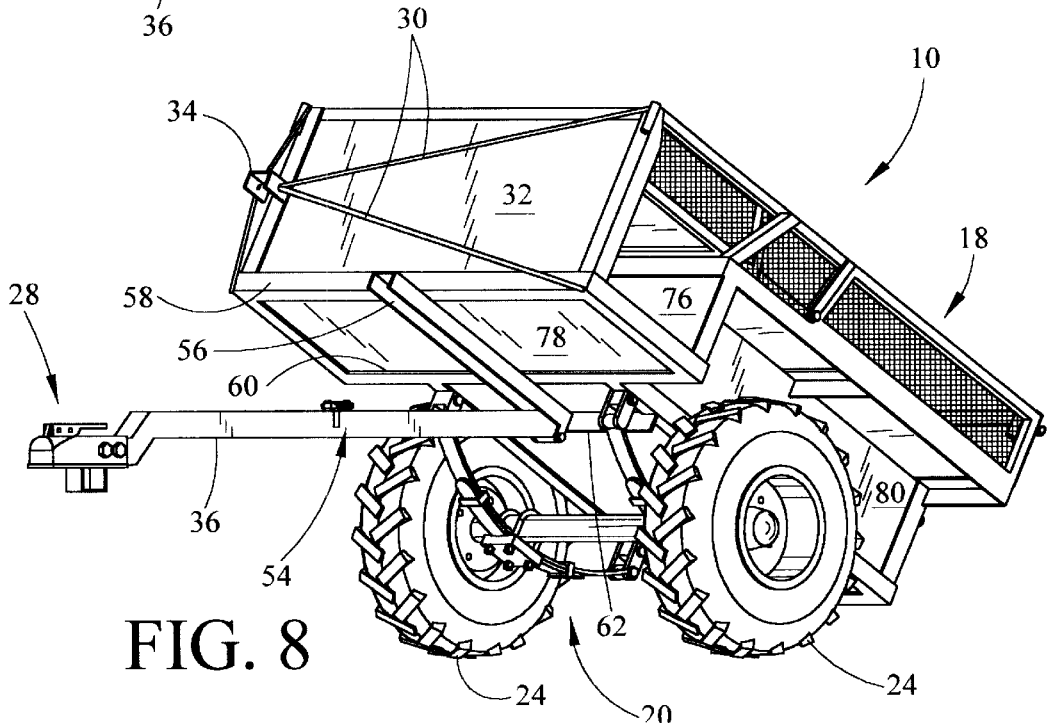
FIG. 8 is a forward isometric elevation view of the ATV trailer illustrated in FIG. 1 in the dump position.

FIG. 8 fully exposes the under carriage 20 of the trailer 10. In this view we see that the tongue member 36 is pivotally attached to the channel member which is in turn attached to the lower frame members 58 and 60 and to a cross-member 62 located behind and adjacent each of the front spring hangers 52.

Figure 9:
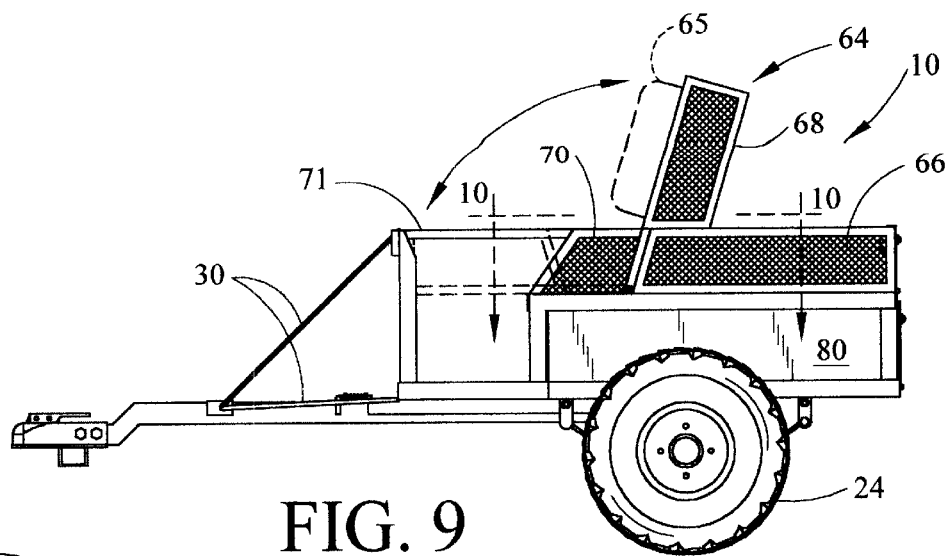
FIG. 9 is a side elevation view of the ATV trailer illustrated in FIG. 1 showing seat transition.
Figure 10:
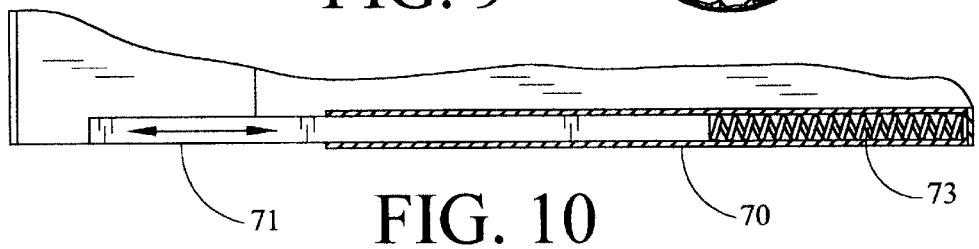
FIG. 10 is a partial cross section view of the guardrail taken along sight line 10—10 as seen in FIG. 9.

Transforming the utility trailer 10 into a passenger transporter is accomplished by raising a forward pivotal portion 64 of the flat bed or deck 14, including a portion of the side rails 18, in the manner illustrated in FIG. 9. This pivotal portion of the deck 14 serves as a backrest assembly 64 and may be padded 65 on the underside if desired. Since a gap exists between side rail members 66 and the front panel 32 as a result of pivoting backrest assembly 64, the upper rail member 70 is fitted with a telescopic filler rail section 71 and is biased by spring 73 in the forwardly extended position, as seen in FIG. 10 and at FIG. 11 at each side of the trailer. The retractable telescopic member 71 extends forwardly from each of the rail sections 70 to engage a bracket or support member on the front panel section vertical frame members 77, thereby serving as a hand rail guard member.

Figure 11:
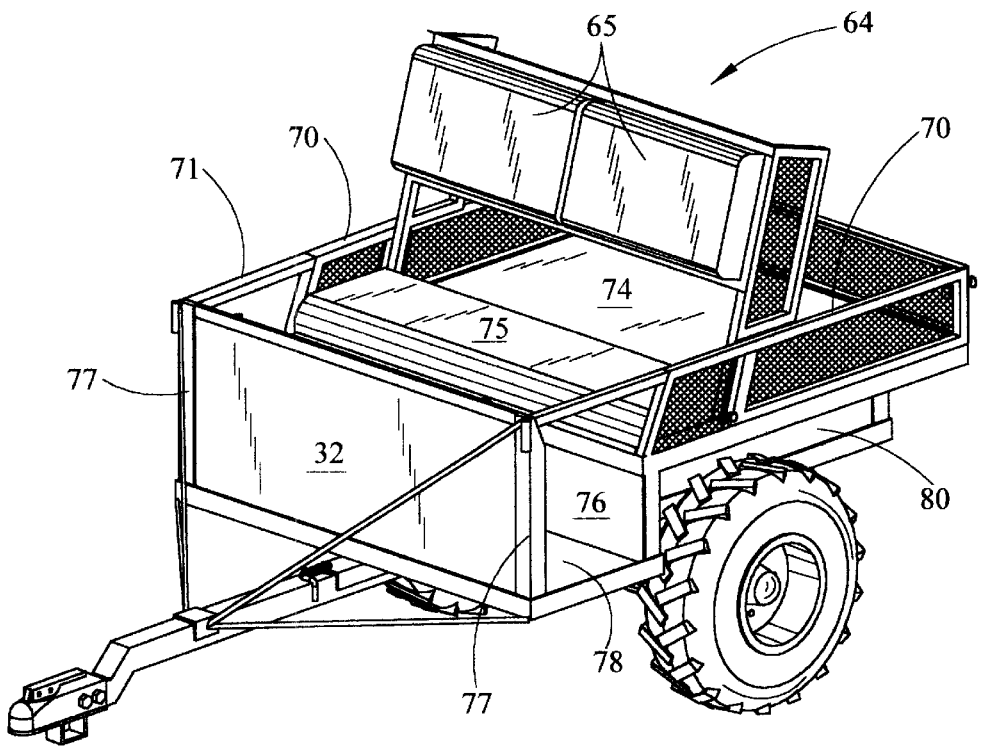
FIG. 11 is a forward isometric view of the ATV trailer as illustrated in FIG. 9.
Figure 12:
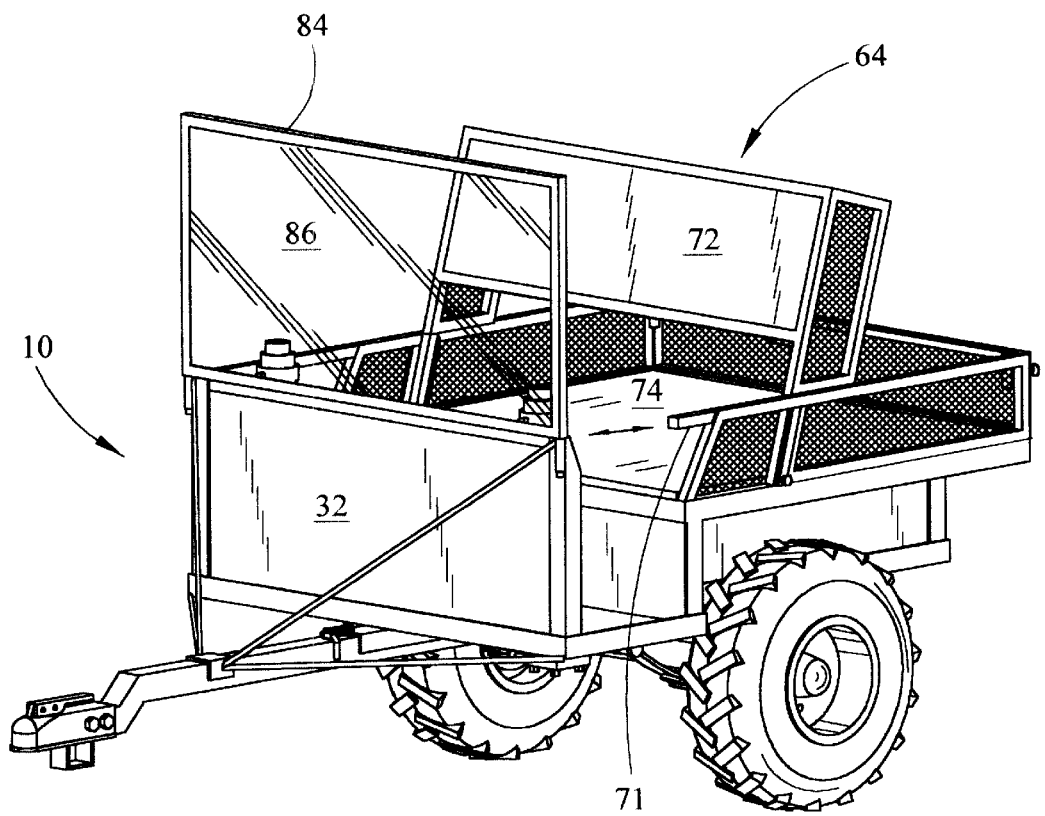
FIG. 12 is a forward isometric view of the ATV trailer as illustrated in FIG. 11; showing wind-shield attachment.

As seen in FIG. 12, the flat bed or deck 14 is now divided into two panel sections, the backrest panel 72 and the remaining deck panel 74 now serving as a passenger seat. Removable seat cushions 75 also may be provided if desired. Sheet paneling members 76 and 78 are provided and secured to the trailer frame members at the forward end of the enclosed compartment and to provide flooring. Additional paneling is provided and secured to the trailer frame on either side and bottom of the enclosed compartment 18, identified as 80 and 82 respectively, as seen in FIGS. 4, 9 and 11.

Figure 13:
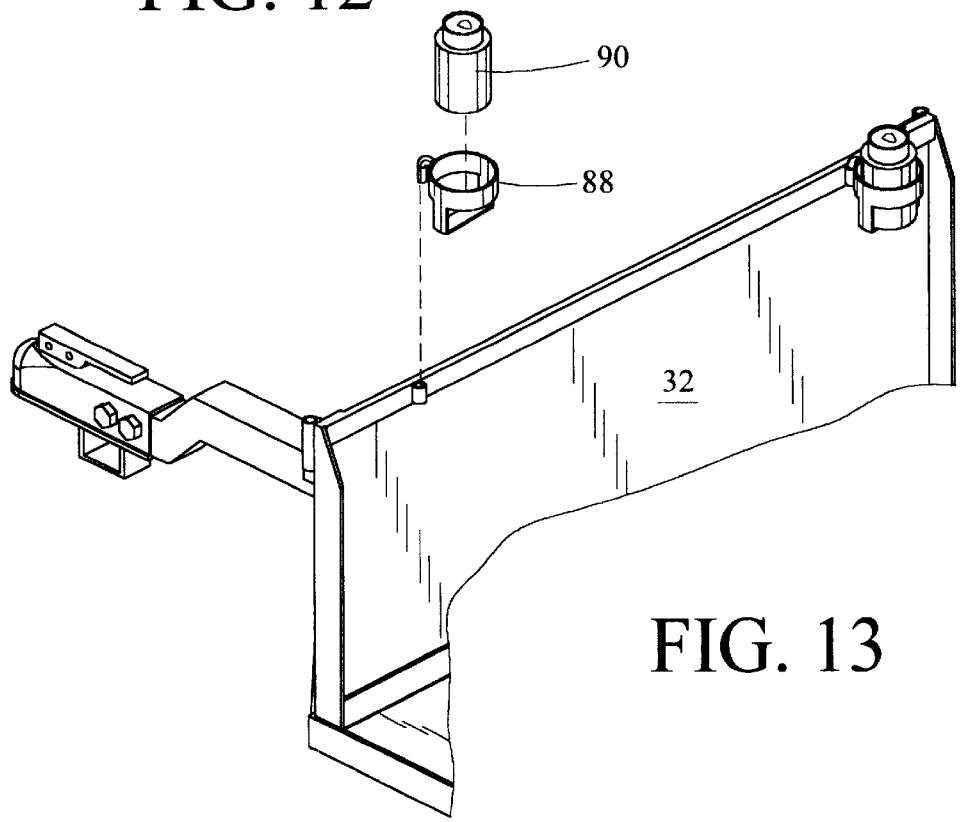
FIG. 13 is a partial isometric view of the ATV trailer showing drink holder attachments.
Figure 14:
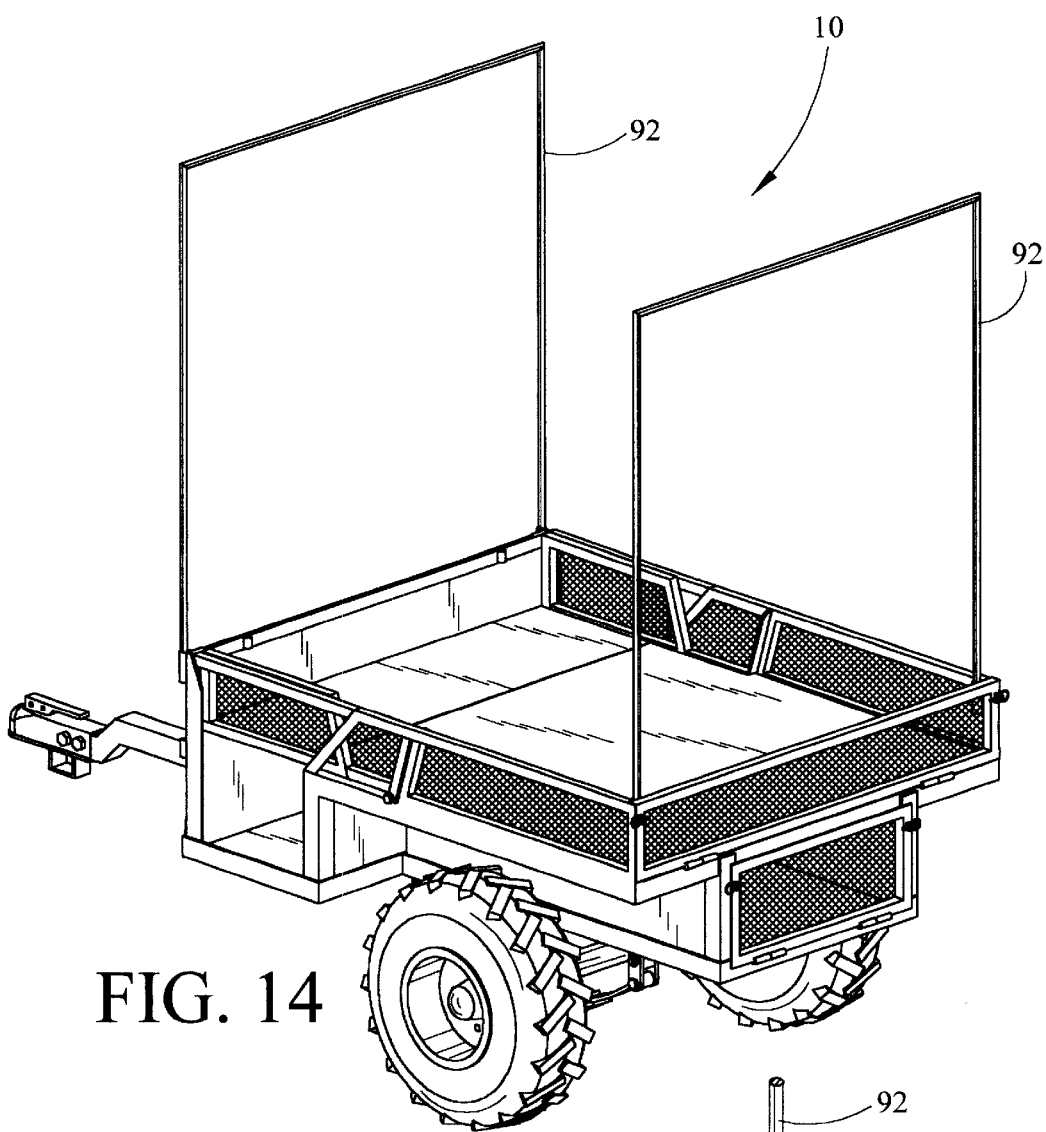
FIG. 14 is a rearward isometric view of the ATV trailer illustrated in FIG. 1 with canopy frames installed.
Figure 15:
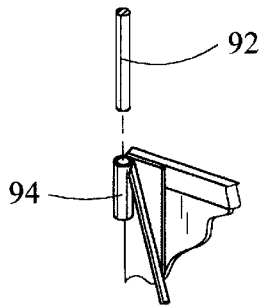
FIG. 15 is a partial isometric view of the front canopy frame sockets.
Figure 16:
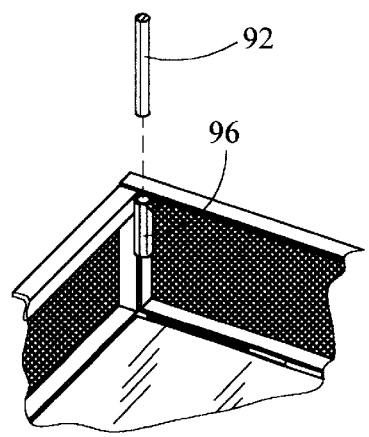
FIG. 16 is a partial isometric view of the rear canopy frame sockets.

Another unique feature is seen in FIG. 12 where we see a removable frame attachable to the front panel 32 frame. The frame 84 is fitted with a clear polymeric panel 86 and serves to shield passengers from mud, rocks, etc. thrown up by the ATV or from low branches. Other amenities may be adapted, such as holders 88 for beverage cans 90 and the like illustrated in FIG. 13. Additionally, as seen in FIG. 14, higher vertical frames 92 may be adapted to the trailer at the front and rear to accommodate a canopy (not shown) for attaching fishing poles, ladders, etc., or for stacking materials in an elevated manner and securing by rope or bungee cord tiedowns to the vertical frames 92. The frames 92 are fitted to sockets 94 and 96 respectively as seen in FIGS. 15 and 16 at the front panel and rear deck tail gate.

Figure 17:
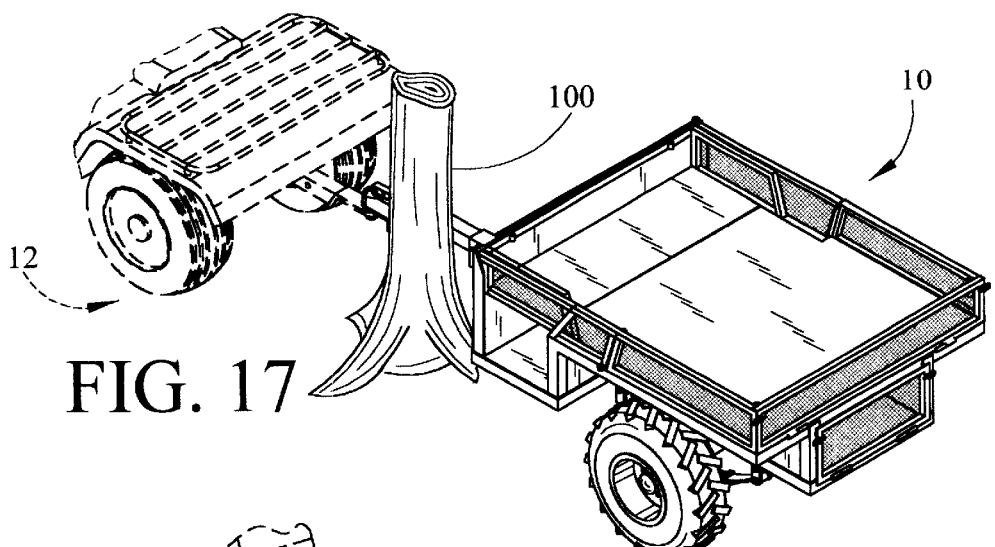
FIG. 17 is an isometric view of the obstacle deflector in operation.
Figures 18, 19:
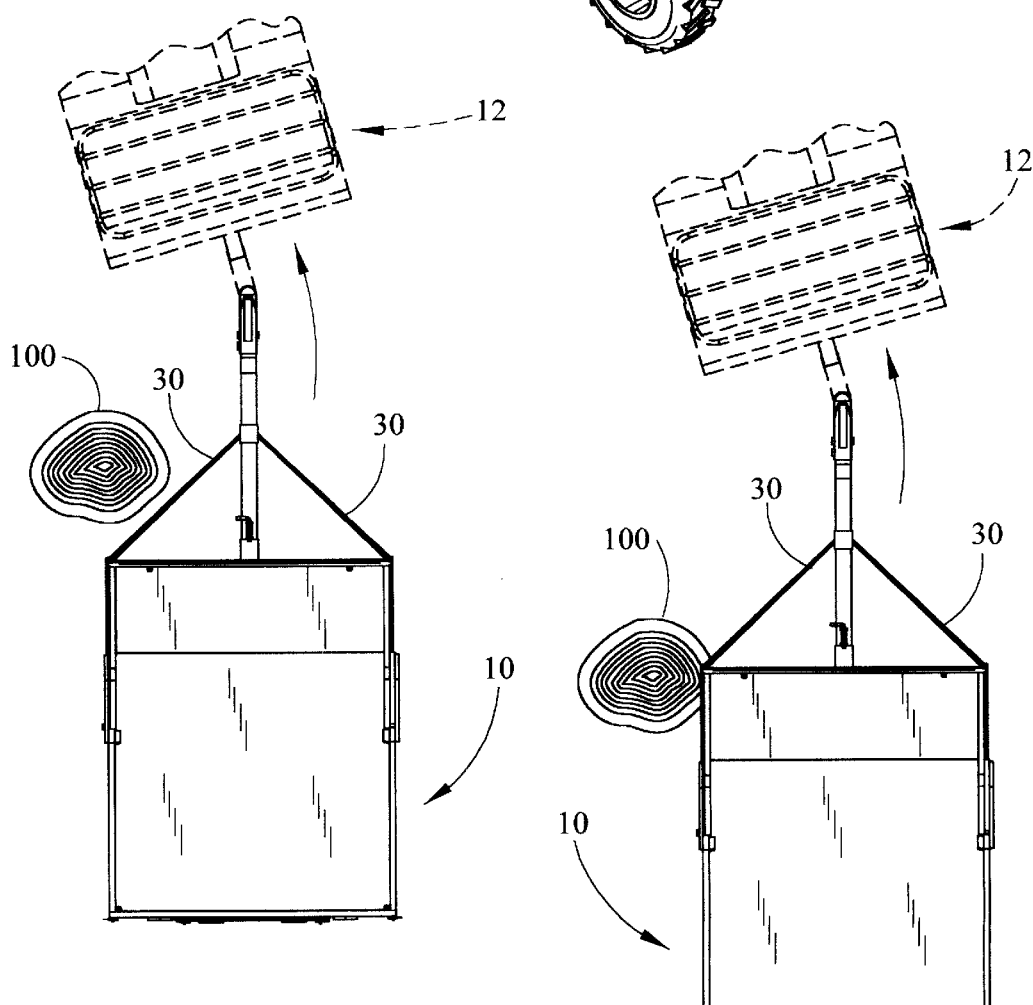
FIG. 18 is an overhead view of the obstacle avoidance operation.
FIG. 19 is an overhead view of the obstacle avoidance operation continued.

As mentioned herein, towing a trailer behind an ATV through rough and uncleared broken terrain is very difficult. As the ATV maneuvers through brush and trees such obstacles may engage the tongue or front panel portion of the trailer, thereby causing significant damage. Deflector rods 30 mentioned above are demonstrated in FIGS. 17, 18 and, 19. FIG. 17 shows how a tree 100 could snag the trailer 10 without deflector bars. FIG. 18 shows the deflector bars 30 contacting the tree 100 and FIG. 19 shows how the trailer 10 is guided to bypass such obstacles by the bars 30.

Figure 20:
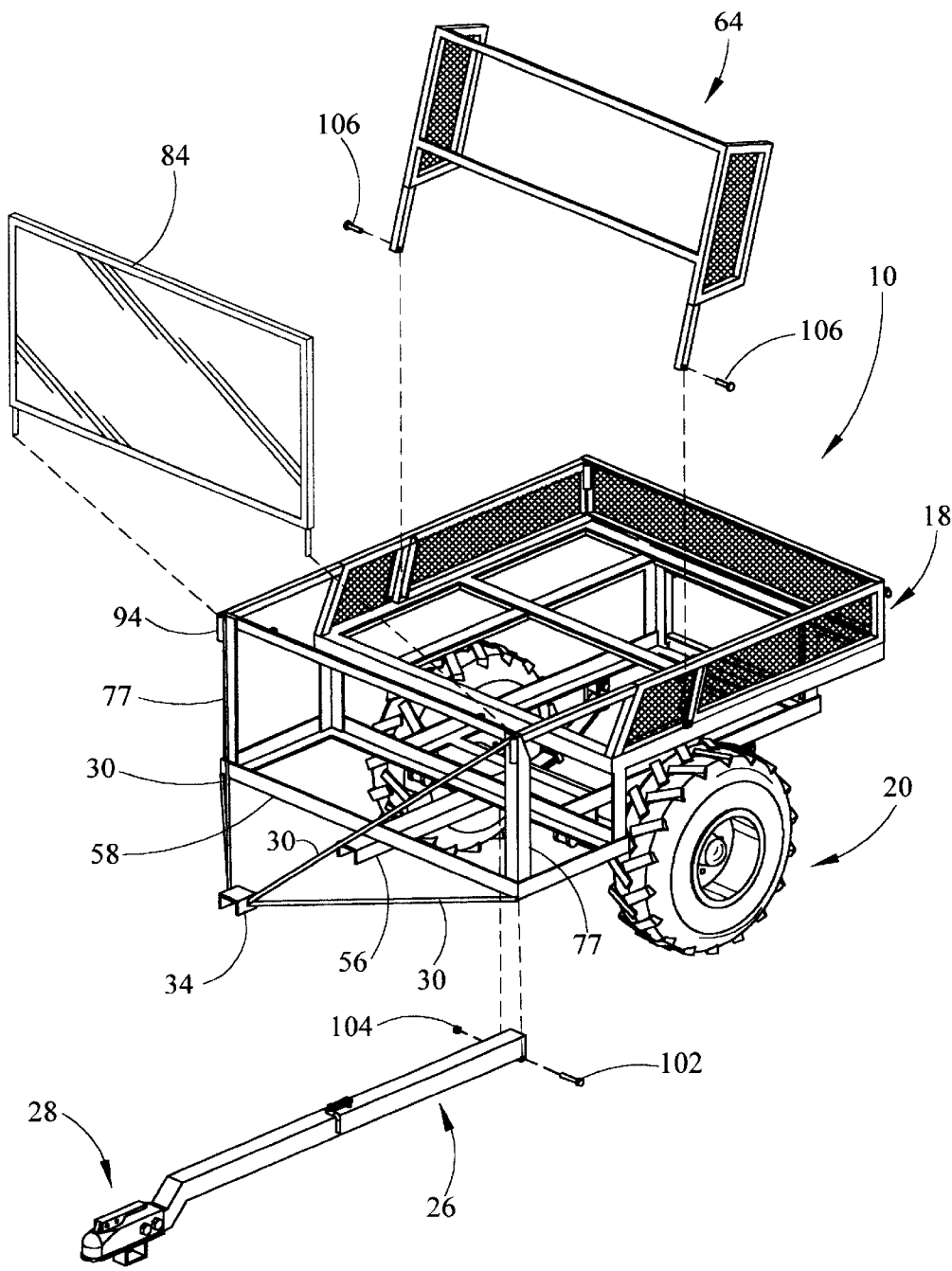
FIG. 20 is a forward isometric exploded view of the ATV trailer as illustrated in FIG. 10.
Figure 21:
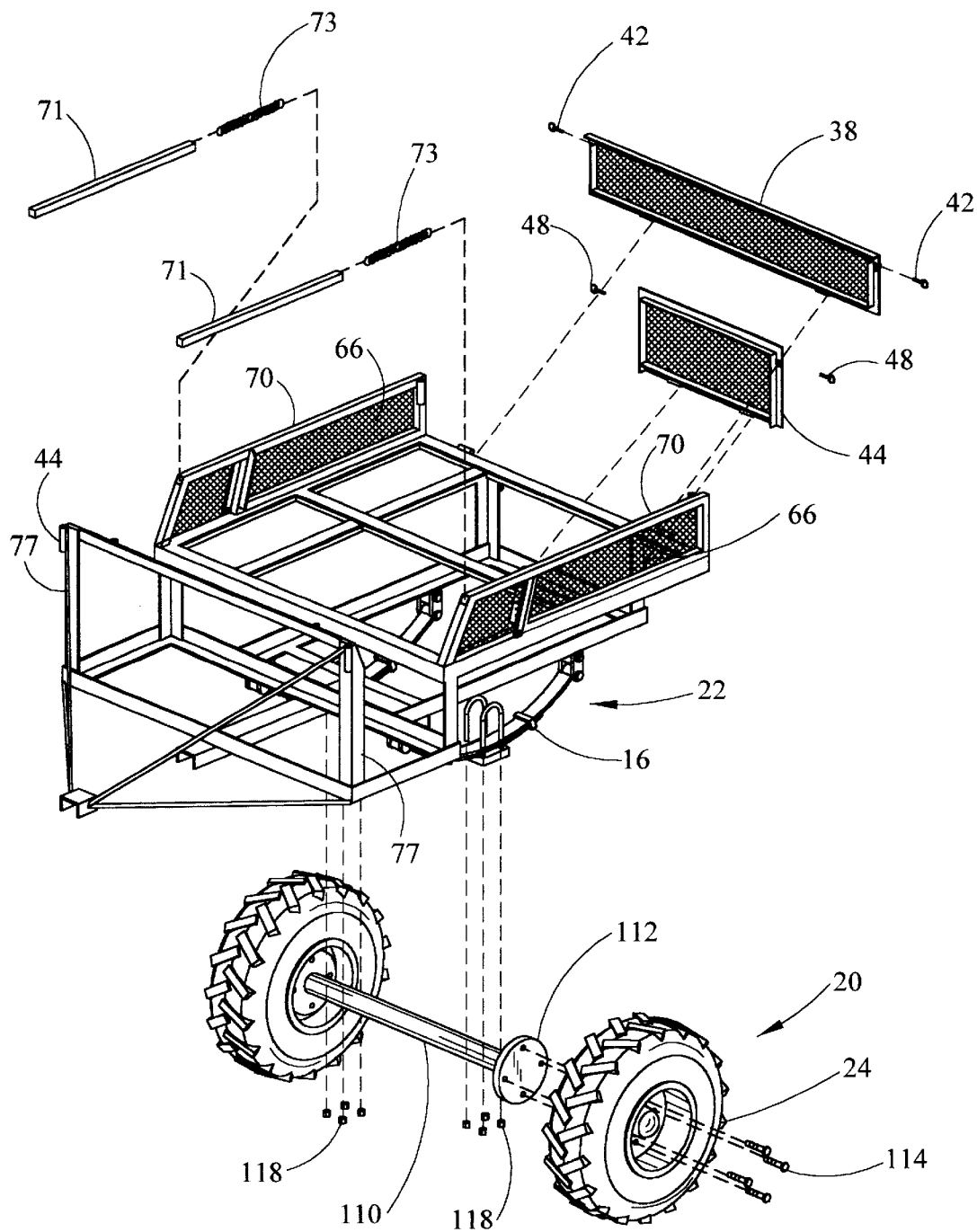
FIG. 21 is a continuation of the isometric exploded view of the ATV trailer illustrated

Looking now at FIGS. 20 and 21, we see the removable elements of the trailer attached to a welded base frame comprised of structural shapes in the configuration illustrated in FIG. 20. The tongue assembly 26 is pivotally attached to the channel 2 member 56 by pin 102 and retainer 104. The forward position of the upper deck assembly 64 is pivotally mounted to the frame and upper railing members 18 with bolts 106. The windshield frame 84 is secured into sockets 94 in the same manner as seen in FIG. 15. The pivotal tailgates 38 and 44 are attached by installing their hinge pins, half of each hinge being welded to the tailgate and the opposing half to the frame members. Sheet material is then fitted to the frames comprising panel members 32, 76, 78, 80, 82 72 and 74. The running gear or axle and wheel assembly 20 includes the axle 110 and hubs 112 with tire and wheels 24, each secured with lugs 114, the axle being bolted to the spring assemblies 22 with U-bolts 116 and retainers 118.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. An ATV off road utility trailer comprising:
 a) a structural frame comprising;
  i) a deck portion having a pivotal portion;
  ii) a first railing member attached to said frame along each of two sides of said deck portion;
  iii) a second railing member attached to each side of said pivotal portion;
  iv) a first gate member pivotally attached to an end of said deck portion adjacent and attachable to an end of each said first railing member;
 b) a transverse walkway suspended from said frame directly below said pivotal portion, said walkway having a vertical frontal panel extending above said deck portion supportive of said pivotal portion;
 c) an enclosed compartment, the width of which is less than that of said deck portion, located perpendicularly to said transverse walkway and attached to said frame below said deck portion;
 d) a second gate member pivotally attached to one end of said enclosed compartment;
 e) an axle and wheel assembly attached to said enclosed compartment; and
 g) a tongue member extending forwardly of said trailer attached to said frame.

2. The ATV off road utility trailer according to claim 1 wherein a portion of said deck portion is utilizable for personnel seating when said pivotal portion is in a raised position, said pivotal portion forming a personnel back support.

3. The ATV off road utility trailer according to claim 2 wherein said pivotal portion is padded on one side.

4. The ATV off road utility trailer according to claim 1 wherein said first and second railing members include a mesh member.

5. The ATV off road utility trailer according to claim 1 wherein said first railing member includes a biased telescopic member.

6. The ATV off road utility trailer according to claim 1 wherein said axle and wheel assembly is attached to said enclosed compartment by way of springs.

7. The ATV off road utility trailer according to claim 1 wherein said axle and wheel assembly includes wheels and tires, said tires being high flotation.

8. The ATV off road utility trailer according to claim 1 wherein said tongue member is pivotally attached to said frame in a manner allowing tongue pivotilization in a vertical plane.

9. The ATV off road utility trailer according to claim 8 further comprising a means for releasing said tongue member in a pivoting manner so as to allow said trailer to tilt into a dump position.

10. The ATV off road utility trailer according to claim 1 wherein said tongue member further includes a hitch assembly for attachment to an ATV.

11. The ATV off road utility trailer according to claim 1 further comprising a deflection means for guiding said trailer around obstacles attached to said frame.

12. The ATV off road utility trailer according to claim 11 wherein said deflection means comprises at least two rods attached to each forward corner of said vertical front panel converging at a channel member midway along said tongue member, said channel member being slidable and disengagable relative to said tongue member.

13. The ATV off road utility trailer according to claim 1 further comprising removable beverage holders attached to said frame.

14. The ATV off road utility trailer according to claim 1 further comprising a windshield member removably attached to vertical front panel.

15. The ATV off road utility trailer according to claim 1 further comprising U-shaped support frames removably attached to said structural frame.

16. The ATV off road utility trailer according to claim 1 wherein said deck, walkway, and enclosed compartment further comprise removable panels cut from sheet material.

* * * * *